BARTON C. SMITH's ANIMAL TRAP.
No. 117005
PATENTED JUL 11 1871
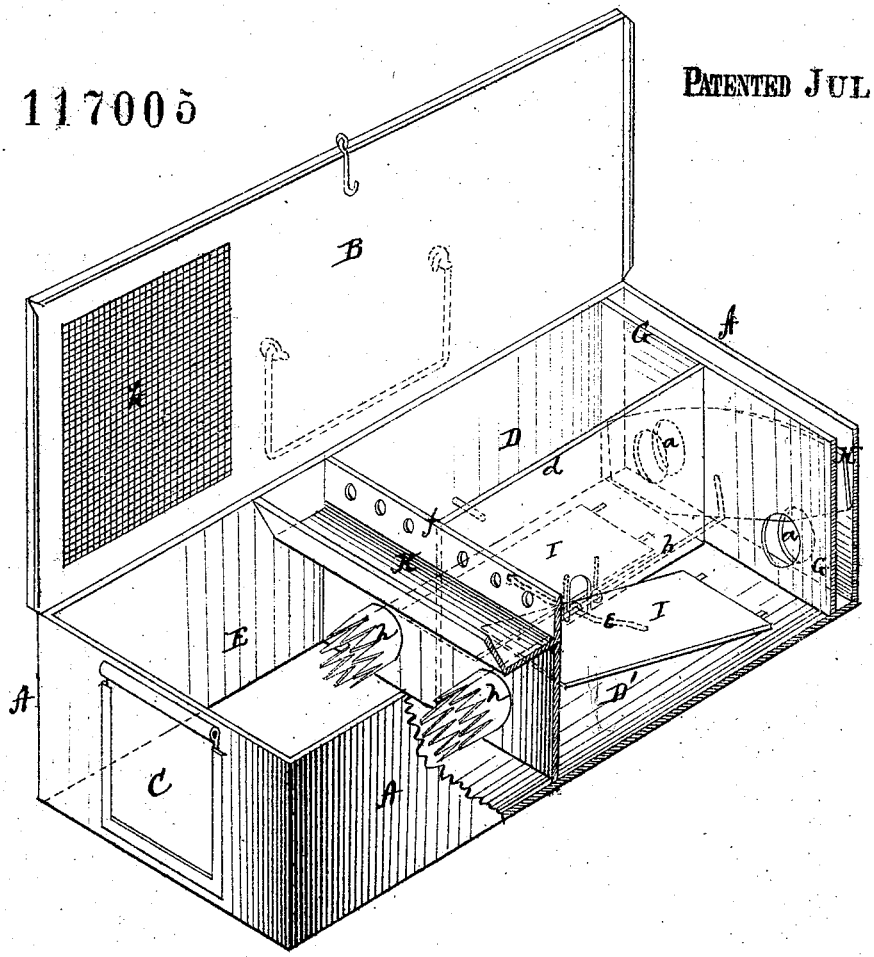
Witnesses.
C. L. Evert.
Jas. O. Hutchinson
Inventor.
Barton C. Smith
his
Alexander Mason
Atty's.

UNITED STATES PATENT OFFICE.

BARTON C. SMITH, OF PEKIN, ILLINOIS.

IMPROVEMENT IN ANIMAL-TRAPS.

Specification forming part of Letters Patent No. 117,005, dated July 11, 1871.

*To all whom it may concern:*

Be it known that I, BARTON C. SMITH, of Pekin, in the county of Tazewell and in the State of Illinois, have invented certain new and useful Improvements in Animal-Traps; and do hereby declare that the following is a full, clear, and exact description thereof, reference being had to the accompanying drawing and to the letters of reference marked thereon making a part of this specification.

The nature of my invention consists in the construction and arrangement of an animal-trap, as will be hereinafter fully set forth.

In order to enable others skilled in the art to which my invention appertains to make and use the same, I will now proceed to describe its construction and operation, referring to the annexed drawing, which represents a perspective view of my trap.

For the body of the trap I provide a rectangular box, A, the length of which is about twice its width, and width about twice its height. The top consists of a lid, B, hinged to one of the sides, as shown. One end of the trap contains a hole, a, at each of its lower corners, to admit the animal to the trap. The other end will, in general, contain a hole for the removal of the animal when caught, said hole being closed by a slide, C. The arrangement of the inside of the trap will consist, practically, of two divisions, D D', in which the animals are entrapped alternately, and one, E, in which they are confined. Just within the front end of the trap, and between it and a guard, G, corresponding in shape with the end, is placed a sector, H, of tin or other suitable material, which serves to open and close the entrances a a alternately. This sector is made from a semicircular piece, a sufficient portion being cut away to clear the holes when tipped on one side or the other. A part of the top may also be cut away, if desired. To operate this sector I attach a wire, b, to its center at right angles. This wire passes back something less than one-half the length of the trap along the lower edge of the partition d placed in the front end of the trap and dividing the compartments D D'. The wire b is hung in bearings attached to the said partition. Near the end of this wire another wire, e, is attached at right angles, projecting one arm into each division D D'. A hole is made in the partition d for one of said arms to work through. These arms are bent so as to coincide with the angle made by the edges of the sector H, and tip back and forward with it by means of the longitudinal wire b which connects them. These arms are made to carry one end of a drop, I, in each division D D' of the trap, the front end of each drop being hinged loosely to the bottom of the trap near the entrance.

The arrangement is such that, when the animal enters the open side and depresses its drop by means of its own weight, the sector is closed behind and the opposite side set accordingly.

To dispose of the animal I employ the following method: It consists in placing a partition, f, across the trap near the middle, said partition forming, with the rear end of the box, the compartment E. From each of the front divisions D D' a hole is made through the partition f, and constructed in such manner that the animal, after getting into this rear division E, cannot return. This is done either by surrounding the hole by a jagged projection, h, on the one side, or covering it with an inclined perforated fall, which allows the animal to pass under, and drops down when it is through. To attract the animal through these openings the rear pit or compartment E is lighted by means of a hole in the lid B, which is covered with wire-gauze k or other suitable arrangement for admitting light. A perforated box, K, containing bait, is placed in any desirable position, so that the animal cannot destroy or devour it.

Having thus fully described my invention, what I claim as new, and desire to secure by Letters Patent, is—

1. The arrangement, in an animal-trap, of two distinct and separate compartments, each with a hinged drop connected with a rocking door, to alternately open and close the entrances to said compartments, substantially in the manner and for the purposes herein set forth.

2. The combination of the sector H, rod b, arms e e, and drops I I, all constructed and operating substantially as and for the purposes herein set forth.

3. In combination with the box provided with the drops I I and sector H, arranged as described, the lighted chamber E provided with the jagged projections h h, all substantially as set forth.

In testimony that I claim the foregoing I have hereunto set my hand this 1st day of February, 1871.

BARTON C. SMITH.

Witnesses:
O. W. SMITH,
JOHN C. BARLOW.